(12) United States Patent
Heinz-Gunter

(10) Patent No.: US 7,676,124 B2
(45) Date of Patent: Mar. 9, 2010

(54) MONOLITHICALLY INTEGRATED OPTOELECTRONIC SUBASSEMBLY

(75) Inventor: Bach Heinz-Gunter, Berlin (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 0 days.

(21) Appl. No.: 12/364,826

(22) Filed: Feb. 3, 2009

(65) Prior Publication Data

US 2009/0202197 A1 Aug. 13, 2009

Related U.S. Application Data

(60) Provisional application No. 61/027,141, filed on Feb. 8, 2008.

(51) Int. Cl.
*G02B 6/12* (2006.01)
*G02B 6/26* (2006.01)
*G02B 6/10* (2006.01)

(52) U.S. Cl. .............................. 385/14; 385/43; 385/46; 385/49; 385/131

(58) Field of Classification Search .................. 385/14, 385/46, 48, 49, 129–132
See application file for complete search history.

(56) References Cited

U.S. PATENT DOCUMENTS 4,316,141 A * 2/1982 Adolfsson et al. ............. 324/96

7,248,800 B2 7/2007 Shimada

FOREIGN PATENT DOCUMENTS

| DE | 100 44 521 A1 | 4/2002 |
|---|---|---|
| WO | 2007/033655 A1 | 3/2007 |

OTHER PUBLICATIONS

Office action issued in corresponding German Application 102008008480.8-35 (Sep. 26, 2008).

* cited by examiner

*Primary Examiner*—Charlie Peng
(74) *Attorney, Agent, or Firm*—Matthew B. Dernier, Esq.; Gibson & Dernier LLP

(57) ABSTRACT

A monolithically integrated optoelectronic subassembly having a waveguide layer stack which is applied on a substrate and has a fiber light-receiving waveguide layer in which at least one photodiode is waveguide-integrated is proposed. A plurality of photodiodes is integrated in the waveguide which is structured laterally and/or vertically in such a manner that there is connected to a coupling waveguide an optical distribution network which in turn feeds the plurality of waveguide-integrated photodiodes in parallel via waveguide parts, which photodiodes are connected electrically in series. All the components are integrated on one chip and conversion of an optical input power into an electrical power is undertaken for current supply purposes. A photodiode can be configured as a signal diode which is supplied from the remaining of the plurality of diodes, as a result of which a self-supplied photodetector is formed. With an antenna which is integrated in addition on the chip, a monolithically integrated antenna circuit which radiates into free space is made available.

18 Claims, 4 Drawing Sheets

MONOLITHICALLY INTEGRATED OPTOELECTRONIC SUBASSEMBLY

CROSS REFERENCE TO RELATED APPLICATIONS

This application claims the benefit of U.S. Provisional patent application No.: 61/027,141, filed Feb. 8, 2008, the entire disclosure of which is hereby incorporated by reference.

BACKGROUND

The invention relates to a monolithically integrated optoelectronic subassembly having a waveguide layer stack which is applied on a substrate and has a fibre light-receiving waveguide layer in which at least one photodiode is waveguide-integrated.

A monolithically integrated optoelectronic subassembly is known from WO 2007/033655 A1, which comprises a waveguide-integrated photodiode for high bandwidths having a semi-insulating single-mode supply waveguide which is integrated monolithically, together with a photodiode mesa disposed above the latter, on a substrate.

A further monolithically integrated optoelectronic subassembly which is configured as photoreceiver is disclosed in DE 100 44 521 A1, in which a waveguide-integrated photodiode, a spot size converter which precedes this photodiode for a standard fibre and an electrical travelling-wave amplifier are integrated monolithically on a chip. The spot size converter comprises, on the photodiode side, a short straight part of the photodiode-waveguide and, on the fibre side, a part of the photodiode-waveguide which tapers in the direction of the fibre, and comprises a semi-insulating layer packet which can act in an optically waveguiding manner, extends over the entire integration area and is disposed under the photodiode-waveguide.

SUMMARY OF THE INVENTION

The object underlying the invention is to produce a monolithically integrated optoelectronic subassembly according to the preamble of the main claim, which converts an optical input power into an electrical power and hence can be used for current supply for integrated circuits which are disposed externally or internally of the subassembly, the subassembly being intended to be extremely compact and to have high robustness relative to electromagnetic interference pulses and to be maintenance-free.

As a result of the fact that a plurality of photodiodes is integrated onto the waveguide layer and that the waveguide layer is structured laterally in such a manner that there is connected to a coupling waveguide an optical distribution network which in turn feeds the plurality of waveguide-integrated photodiodes in parallel via waveguide parts, which photodiodes are connected electrically in series preferably via a planar metal structuring, all the components being integrated on one chip and conversion of an optical input power into an electrical output power being undertaken, a monolithically integrated optoelectronic subassembly which can serve for current supply purposes is made available. As a function of the number of photodiodes connected in series, optional output voltage values can thereby be produced in the range of a few volts without using efficiency-impairing and interference signal-producing DC/DC converters, which is advantageous in particular in electromagnetic interference signal-sensitive operational environments (sensitive photoreceivers in telecom/datacom/sensor applications).

The distribution network is preferably configured as a multimode interference filter.

Due to the specific lateral structuring, the waveguide layer can be used not only to form the photodiode supply waveguide or the coupling waveguide in addition to the tapering thereof at the chip start but instead this layer also serves to produce MMI couplers which are integrated in the supply waveguide and enable light distribution of any design to a plurality of photodiodes, no lateral leakage currents between a plurality of adjacently disposed photodiodes needing to be feared due to the semi-insulating properties of the complete waveguide layer packet.

Advantageous developments and improvements are possible due to the measures indicated in the sub-claims.

Advantageously, the light radiates laterally into the waveguide layer, again the coupling waveguide having a tapering region in a particularly advantageous manner, as a result of which a robust, stable and economical fibre assembly is possible with a small number of necessary adjustments and for example a butt fibre can be used. Of course other irradiation possibilities are conceivable. Thus the light can be introduced into the waveguide layer for example slantwise via a 45° reflector which is produced by etching.

Preferably, a capacitor, for example a double capacitor, is jointly integrated on the chip in order to smooth the current supplied from the photodiodes so that a direct voltage or a direct current can also be obtained from modulated light-optical signals.

In a preferred embodiment, the waveguide-integrated photodiodes are surrounded by a first dielectric layer, for example made of benzocyclobutene (BCB), which is applied on the waveguide layer, as a result of which dark currents are minimised and high conversion efficiencies of the photodiodes are achieved. The BCB layer can also serve for high-quality insulation of the electrical connections between the photodiodes. The latter purpose is achieved in planar form by a second advantageously provided dielectric layer, for example made of silicon nitride. The two different dielectric layers which are provided are intended to assist independent optimisation of the semiconductor and conduction structures with respect to insulation, passivation and antenna-radiating properties.

In a particularly advantageous embodiment, one of the plurality of waveguide-integrated photodiodes is a small-area signal photodiode for emitting a high frequency signal which is supplied with current from the other waveguide-integrated photodiode(s). An independently supplied photodetector can be made available as a result of this configuration, a photoreceiver being achieved when configuring the signal photodiode as reception diode, the reception diode being connected advantageously to a matching load integrated jointly on the chip. Hence an ultrafast photoreceiver (1480 to 1620 nm) is made available without external current supply in monolithic waveguide integration with evanescent optical coupling as a chip which is suitable for data rates of 40 Gbit/s and higher and is suitable at present, because of the measured bandwidth around 70 GHz, even for 80 to 100 Gbit/s. Bandwidths of for example 10 GHz to over 200 GHz are possible.

In fibre-optic remotely-supplied sensor networks or in fast optoelectronic measuring devices, e.g. oscilloscopes, it can be used as O/E front end which requires no current supply. The integrated photoreceiver has a small PDL (polarisation dependent losses) of <0.3 dB, has a high signal dynamic of >55 $dB_{electrical}$, a high electrical output level up to −6 dBm, a response capacity up to 0.35 A/W in the case of only one photodiode as bias element. Furthermore, the photoreceiver according to the invention is robust relative to optical interference peaks in the range of +22 dBm, has an optical input power up to +18 dBm and the number of bias diodes or supply diodes can be chosen corresponding to the application example, e.g. 1 to 3 or more diodes can be integrated.

In an advantageous embodiment, the optical distribution network or the optical coupler can have a wavelength-dependent configuration which divides the light entering into the waveguide layer into light with a signal wavelength for the signal photodiode and with a supply wavelength for the supply photodiode(s). As a result, the supply photodiodes can be fed independently of the signal diode at a second wavelength so that no reduction in responsivity in the case of a two-wavelength supply occurs since the coupler supplies all the light of the signal wavelengths to the small signal photodiode and conducts all the light of the supply wavelength to the other outputs.

In a further particularly preferred embodiment, the waveguide-integrated signal photodiode is configured as a transmitting diode which is in communication with a planar antenna structure which is jointly integrated on the chip and is fed by RF technology from the signal-pin photodiode. As a result, an independently supplied monolithically integrated PIN antenna chip able to transmit into free space is made available, which avoids any possible ESD- and excess voltage risks of the monolithic circuit and in the case of which a glass fibre with modulated light remains as the sole supply line. Such an antenna chip can be used as transmitting element in microcellular radio networks which are supplied by glass fibre in sub-THz spectroscopy for material analysis and in sub-THz free space transmission stretches. As explained already, a self-supplied ultra-miniaturised all-in-one chip is made available at the end of a glass fibre with an ultrahigh bandwidth as far as the sub-THz range (several 100 GHz) which requires no external current supply and has an ultra-compact footprint in the $mm^3$ range. The further properties are comparable with the properties listed for the photoreceiver.

Advantageously, an RLC coplanar line-matching network between signal photodiode and planar antenna can be jointly integrated on the chip, the antenna structure being able to be configured as logarithmically periodic, as dipole or as bowtie antenna or the like.

Preferably, the metallisations for the large-area planar monolithically jointly integrated antenna structure are applied on the BCB dielectric layer, which serves for high-quality insulation of the antenna structure. The antenna structure can be disposed optionally on the second dielectric layer. It is possible as a result of these measures to influence, in addition to leakage current optimisations inter alia, also the radiation ratios forwards/backwards.

BRIEF DESCRIPTION OF THE DRAWING

Embodiments of the invention are represented in the drawing and are explained in more detail in the subsequent description. There are shown.

DETAILED DESCRIPTION OF THE INVENTION

The basic concept of the optoelectronic subassembly according to the invention resides in the combination of a flexible parallel optical supply of photodiodes by means of an optical distribution network, associated with a flexible electrical connection possibility of these photodiodes, the entire subassembly being integrated in monolithic form on a single chip.

Figure 1:
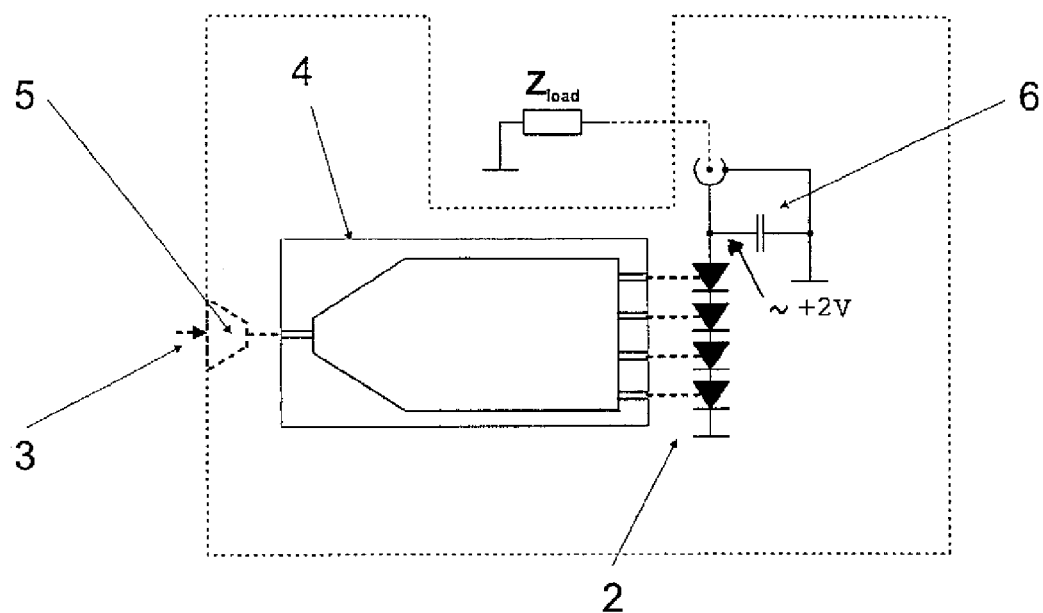
FIG. 1 a basic circuit diagram of the monolithically integrated optoelectronic subassembly according to the invention according to a first embodiment, which is configured as an optoelectronic converter, FIG. 2 a basic circuit diagram of the monolithically integrated optoelectronic subassembly according to the invention according to a second embodiment, which is configured as a self-supplying photodetector or photoreceiver, FIG. 3 a basic circuit diagram of the monolithically integrated optoelectronic subassembly according to the invention according to a third embodiment, which is configured as a self-supplied pin photodiode antenna circuit, FIG. 4 a schematic layer structure of the optoelectronic subassembly according to the invention with planar metal structuring, FIG. 5 a chip layout of an optoelectronic converter according to the first embodiment with lateral structuring, FIG. 6 a chip layout of a self-supplied photodetector according to the second embodiment with lateral structuring, and FIG. 7 frequency responses of the self-supplied photodetector according to the second embodiment with different optical input powers.
Figure 4:
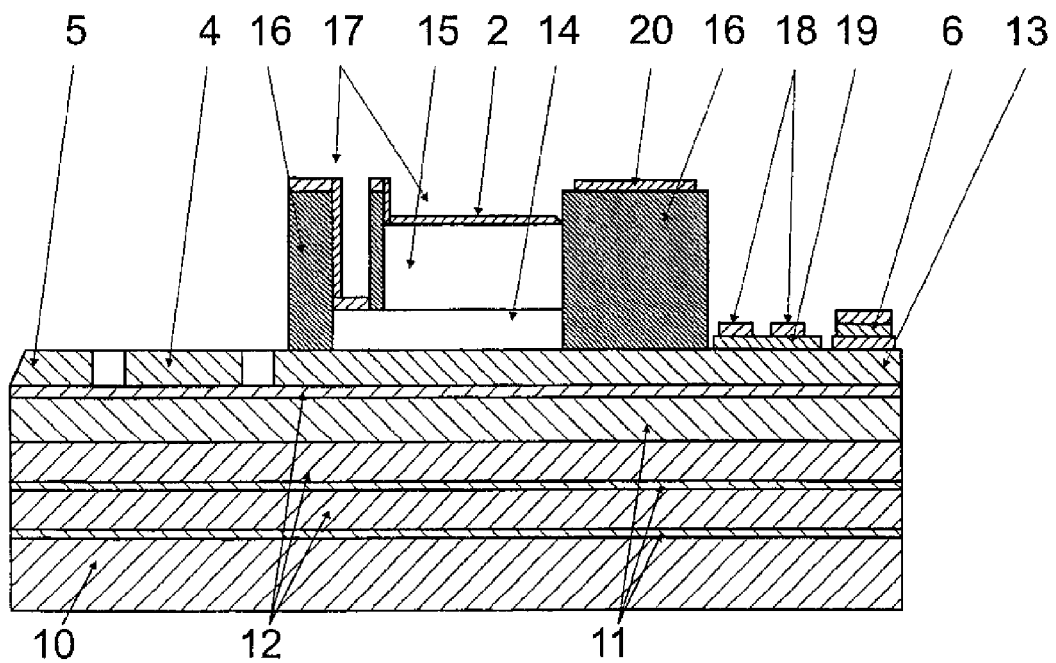
Figure 5:
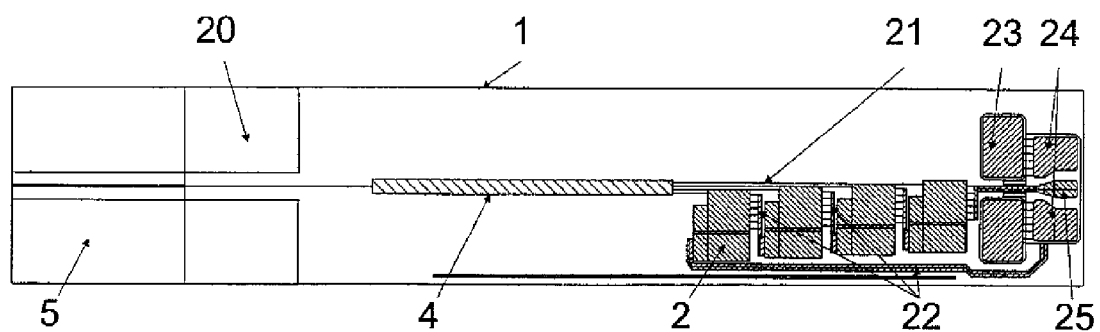

The simplest expression of the invention as such a subassembly is an optoelectronic converter, as represented in FIG. 1 in the basic circuit diagram, in FIG. 5 as chip layout and in FIG. 4 by the general vertical layer structure. However, metallisations are also introduced in FIG. 4, which are not used in the case of the optoelectronic converter but are intended to serve for explanation of the further embodiments.

The converter represented in FIG. 1 supplies an output voltage of several volts, in the present case approx. 2 V, above the band spacing of a single photodiode (typically 0.7 V). A plurality of photodiodes 2, here four photodiodes, are therefore connected in series. The photodiodes 2 are supplied optically in parallel from a glass fibre signal 3, a distribution network 4 being provided between the glass fibre and the photodiodes 2, said distribution network preferably comprising a multimode interference coupler MMI. The optical input waveguide of the MMI should be adapted optimally as far as possible to the mode field diameter of a standard single-mode fibre SMF (standard single-mode fibre) which is for example a butt fibre so that an optical taper 5 is jointly integrated. This taper 5 is indicated schematically in FIG. 1, just like the optical distribution within the coupler 4. As can be detected, the four photodiodes are connected in series between earth and output, a smoothing capacitor 6 being connected in addition between the output and earth which is jointly integrated likewise in order to obtain a direct voltage or a direct current from modulated light-optical signals. The arrangement of the components on a chip 1 is indicated by the framing in broken lines. An external load which is designated with $Z_{load}$ is likewise indicated.

The vertical integration concept with waveguide-integrated photodiodes and the waveguide-integrated optical distribution network is represented in FIG. 4, the layer structure having an InP:Fe substrate 10 and a layer sequence disposed thereon of in total semi-insulating GaInAsP light guiding layers 11 and InP spacer layers 12 disposed therebetween. The uppermost layer of the layer stack which is produced epitaxially is a GaInAsP:Fe semi-insulating waveguide layer 13 which includes the input taper 5 and the distribution network 4. The photodiodes 2 are disposed on the waveguide layer 13, merely one photodiode thereof being able to be seen here which comprises an n-doped GaInAsP:Si-contact layer, an absorption layer and a P-contact layer applied on the waveguide layer, the last two layers being combined with the reference number 15. The n-contact layer 14 is thereby lengthened relative to the layers 15 situated thereabove in the direction of the distribution network 4 or of the input taper 5 which has a ramp-like configuration, as a result of which the quantum efficiency is improved. The waveguide-integrated photodiode(s) 2 or the layers thereof 14, 15 are surrounded by or embedded in a first dielectric layer 16 which is configured in the embodiment as a BCB layer. Metal structurings 17 are applied on the layer arrangement of the waveguide-integrated photodiode 2 and of the n-contact layer, said metal structurings being configured as corresponding contacts and as corresponding connection lines to the other photodiodes. In addition, in FIG. 4 there is also the capacitor 6 which is configured as an MIM (metal-insulator-metal) capacitor and also coplanar HF connection lines 18 on a second dielectric layer 19 made of SiNx and also an antenna structure 20, the latter belonging to the subsequently described embodiments.

The photodiodes 2 are passivated completely with the BCB dielectric 16 in order to achieve as high as possible reception sensitivities and minimisation of dark currents, the BCB layer 16 also serving for high-quality insulation of the large-area planar antenna structure 20 (see subsequent description) and possibly also for insulation of the electrical connections between the photodiodes 2. The last purpose is achieved in a more planar form also by the second dielectric layer 19, e.g. made of silicon nitride. The electrical connection lines are, on the one hand, the air bridges of the p-contact of the photodiode 2 which are now covered by BCB either in a supporting or at least stabilising manner, secondly, the DC and coplanar RF connection lines which connect the photodiodes and, as explained already, the metallisations for the large-area planar monolithic jointly integrated antenna structure.

In FIG. 5, the chip layout of the subassembly or of the converter is represented according to FIG. 1 and corresponding to the vertical integration according to FIG. 4. The waveguide layer 13 from FIG. 4 is thereby structured specifically laterally and/or vertically. The structuring takes place by means of reactive ion beam etching (RIE) with a corresponding etching depth control using the phosphorus signal from layers of different compositions. At the left chip end according to FIG. 5, the taper region 5 is configured, said taper region 5 being structured with modified ion beam etching (CAIBE), to which a short waveguide piece is connected, which together form an input waveguide 20. The input waveguide opens into the MMI coupler 4 which is configured here as a 1:4 coupler. The MMI coupler 4 supplies, via individual waveguide parts 21, four optically parallel-fed photodiodes 2 which are connected in series via electrical lines 22, with which their photovoltages are added. A double capacitor 23 which corresponds to the capacitor 6 from FIG. 1 smoothes the output current in the cases in which optically modulated light is radiated in. The photodiodes 2 are connected to output pads 24, 25 via the connection lines 22, at which pads the direct current signal can be removed until there is an open circuit voltage, here 4 times the individual diode open-circuit voltage. The open-circuit voltage of a good 2 V depends, as was also able to be detected in measurements, barely upon the optical power, whilst the short circuit current increases linearly with the optical input power. The photodiodes 2 have for example dimensions of $10 \times 40\ \mu m^2$.

Figure 2:
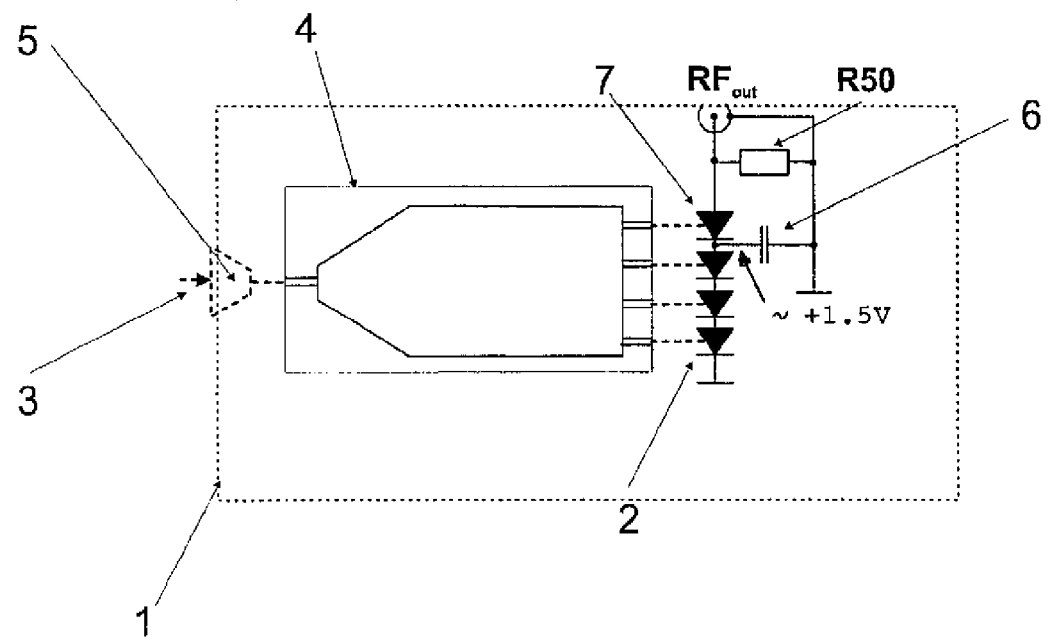

In FIG. 2, a self-supplied photodetector is represented as second embodiment or as development of the first embodiment, in which photodetector one of the photodiodes, which is connected in series, is replaced by a very short, small-area high frequency signal photodiode 7. Such a signal photodiode has for example the dimensions of $5 \times 20\ \mu m^2$. The remaining three large direct current diodes 2 now serve for bias voltage in the blocking direction of this signal diode 7.

The jointly integrated capacitor 6 smoothes this actually pulsing direct voltage supply since this application is to be based on modulated light signals. At the output of the signal photodiode 7, a 50 ohm matching load R50 is jointly integrated and ensures good signal integrity in conjunction with non-reflection-ideal subsequent amplifiers. At the same time, it can assume the function of the direct current return path of the signal photocurrent to circuit earth. The signal photodiode 7, because of its necessary rapid speed, already has a smaller surface area than the supply photodiode 2. Hence the saturation photocurrents of the supply diodes are always higher than the saturation photocurrent of the signal photodiode 7. Consequently, the supply diodes 2 with their higher current productivity can always impress their open-circuit voltage on the signal photodiode 7 so that, over a large range of optical input intensities, an essentially linear operation can be expected. At the output RFout, the signal voltage is applied. The other elements correspond to those of FIG. 1.

The vertical integration concept corresponds in turn to that according to FIG. 4 and the explanations given in the context of FIG. 4 apply correspondingly.

Figure 6:
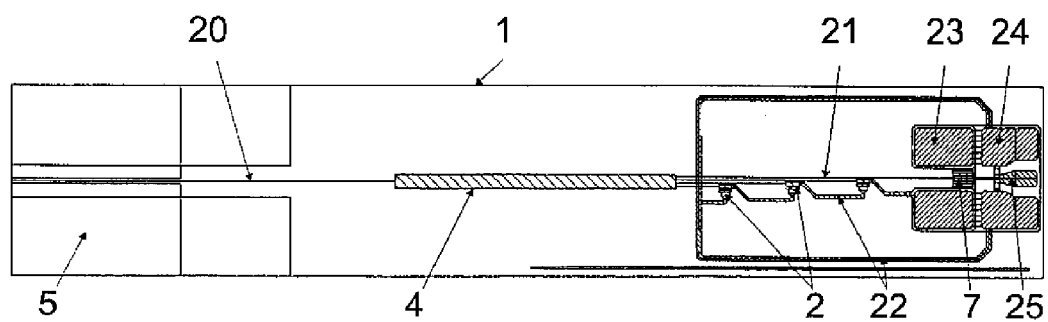

FIG. 6 shows a possible chip layout of the self-supplied photodetector, three supply photodiodes 2 of an average surface area being provided here and the signal diode 7 or 17 which is disposed in the layout between the double capacitor has in turn a smaller surface area. The other elements correspond to those according to FIG. 5 so that the description thereof is omitted.

The structuring of the waveguide layer 13 according to FIG. 4 is undertaken again laterally, however the taper region 5, as also in the previous example, being able to be achieved by a vertical structuring by means of etching.

With respect to the size of the supply diodes 2, also those from FIG. 5 can be chosen. The variance in the surface areas of these current supply diodes serve for examination of the bandwidth and dynamics of the subassembly.

Figure 7:
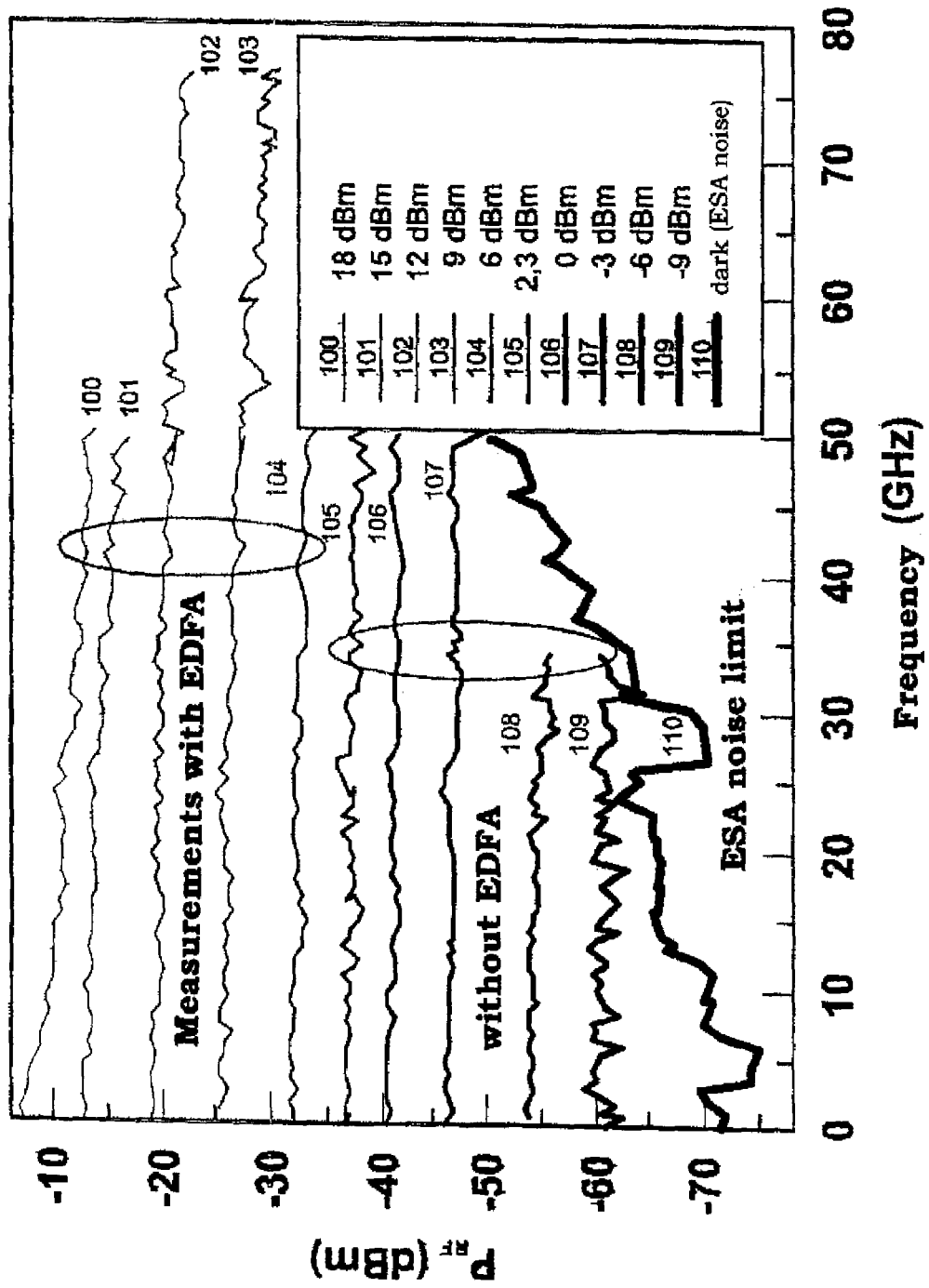

In FIG. 7, curves of the power $P_{RF}$ of the photodetector according to FIG. 6 over the frequency are represented over a large range of the optical input power of −9 to +18 dBm, the upper curves applying for measurements with an EDFA (erbium-doped fibre amplifier) and the lower ones without this. The Figure shows that the self-supplied photodetector can be operated over a really large range of the optical input power at high bandwidths up to 72 GHz so that it has a power dynamic of at least 55 dB at the electrical output. It is hence shown that the internal current supply from the optical signal can be used over wide power ranges. Possible applications are aimed therefore at the 40 to 80 Gbit/s data rate range, the circuit diagram however enabling also optimisations for arbitrarily smaller bit rates.

The embodiment of the light-dividing MMI coupler 4 is demonstrated by way of example in the embodiments with four equal-value outputs. This light-dividing element can however be designed in principle with an arbitrarily large number of outputs. Hence according to the application, the signal diode 7 can be biased in the blocking direction with for example one, two, three or even more current supply diodes 2. However, the signal photodiode 7 also maintains only a divisor fraction of the optical power so that the responsivity (A/W) reduces according to design with an increasing number of supply diodes. Since PIN diodes of suitable dimensioning can operate well even with very small biases (e.g. 0.5 V), constructions with only one supply diode (1:2 MMI) are also worthwhile so that the responsivity of the signal diode 7 would then be half of the possible responsivity of a signal diode connected directly to the supply waveguide. The supplementary intrinsic losses of the MMI coupler are below <1 dB and are hence virtually negligible.

It is conceivable as a further embodiment that the distribution network is configured in the MMI construction as elements which divide light on a wavelength-selective basis in such a manner that supply light is used on a second wavelength so that no reduction in responsivity when feeding with two wavelengths would occur since then the coupler supplies all the light to the signal wavelength of the signal photodiode and conducts all the light of the supply wavelength to the remaining outputs for the supply diodes.

Figure 3:
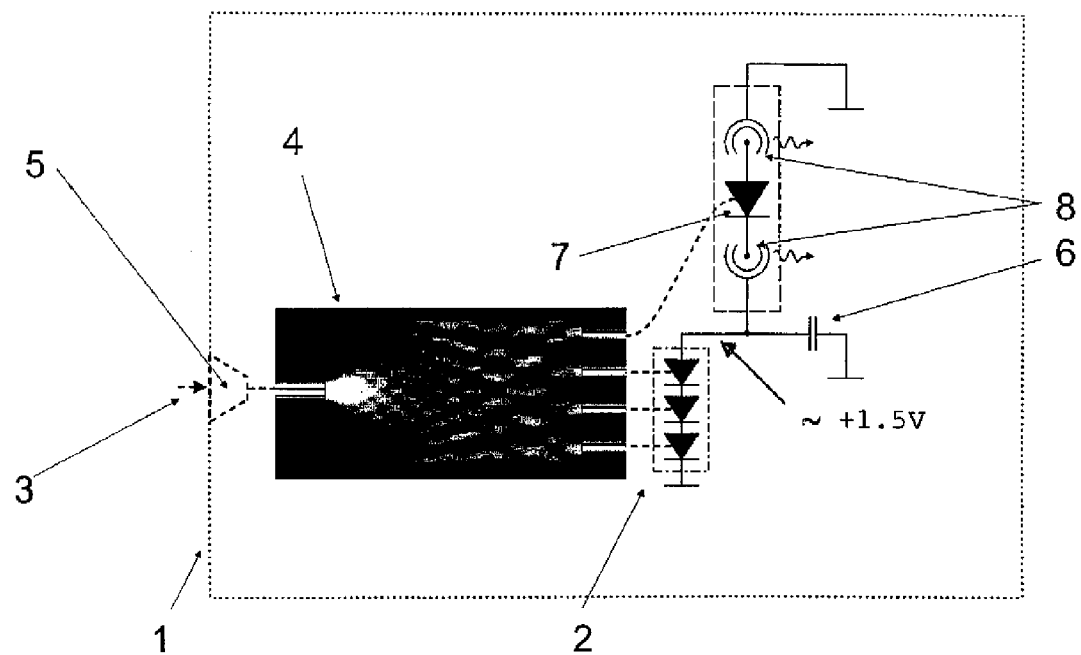

FIG. 3 shows a further embodiment of the invention and development of the second embodiment, a planar antenna structure 8 being provided which is supplied in RF technology from the signal PIN photodiode 7. In this way, a self-supplied monolithic antenna chip which can transmit into free space is made available. No external current supply is required here either. The production of the capacitor-filtered current supply is within the monolithic chip corresponding to FIG. 3.

The light-dividing 1:4 MMI coupler is used again by way of example, said coupler feeding the small-area signal-PIN photodiode 7 which is hence capable of the highest frequency and, as in the embodiments of the invention previously, with the remaining outputs, e.g. three, feeds current supply photodiodes 2 of a larger surface area, which ensure the bias of the signal photodiode via the serial connection shown. The jointly integrated capacitor 6 smoothes the supply current which is obtained from the amplitude-modulated light.

All the elements of this embodiment are contained in the vertical integration of FIG. 4, the antenna structure with 20 being applied there as metallisation on the BCB dielectric layer 16. When using a logarithmic-periodic circularly toothed planar antenna, the supply of the BCB-passivitated waveguide-integrated PIN-signal photodiode into the centre of the antenna structure is undertaken, the P-contact and the N-contact being connected to the corresponding parts of the antenna.

In addition, there can be provided in the case of the antenna chip, another electrical RLC coplanar line-matching network which possibly improves the efficiency in a frequency-selective manner and is jointly integrated likewise monolithically.

In the case of the waveguide layer stack, the substrate 10 is configured as a semi-insulating InP but it can also comprise high ohmic GaAs or other semiconductors if the material matching of the absorber layer to other operating wavelengths demands it.

The invention claimed is:

1. A monolithically integrated optoelectronic subassembly, comprising:
   a substrate; and
   a waveguide layer stack which is applied on the substrate and has a fibre light-receiving waveguide layer in which at least one photodiode is waveguide-integrated,
   wherein: (i) a plurality of photodiodes are integrated in the fiber light-receiving waveguide layer which is structured laterally and/or vertically such that a coupling waveguide is connected to an optical distribution network which in turn feeds light to the plurality of waveguide-integrated photodiodes in parallel via waveguide parts; (ii) the plurality of photodiodes are electrically connected in series; (iii) all the components are integrated on one chip; and (iv) an optical input power is converted into an electrical power for current supply purposes.

2. The subassembly according to claim 1, wherein the optical distribution network is configured as a multimode interference coupler.

3. The subassembly according to claim 1, wherein the coupling waveguide has a taper region.

4. The subassembly according to claim 1, wherein one of a capacitor and a double capacitor, is jointly integrated on the chip in order to smooth a current supplied from the plurality of photodiodes.

5. The subassembly according to claim 1, wherein the plurality of photodiodes are connected in series via a planar metal structuring.

6. The subassembly according to claim 1, wherein the plurality of waveguide-integrated photodiodes are at least partially surrounded by a first dielectric layer which is applied on the waveguide layer for passivation thereof.

7. The subassembly according to claim 6, wherein the first dielectric layer comprises benzocyclobutene.

8. The subassembly according to claim 7, further comprising a second dielectric layer provided on the waveguide layer for insulating at least parts of connection lines which are specified by planar metal structuring.

9. The subassembly according to claim 8, wherein the second dielectric layer comprises $SiN_x$.

10. The subassembly according to claim 1, wherein the fibre light-receiving waveguide layer receives light laterally.

11. The subassembly according to claim 1, wherein one of the plurality of waveguide-integrated photodiodes is a small-area signal photodiode for emitting a high frequency signal, which is supplied with current from the other(s) of the plurality of waveguide-integrated photodiode(s), which at as a plurality of supply photodiodes.

12. The subassembly according to claim 11, wherein the waveguide-integrated small-area signal photodiode is configured as a reception diode of a photoreceiver and is connected at the output thereof to a matching load which is jointly integrated on the chip.

13. The subassembly according to claim 11, wherein the optical distribution network is wavelength-dependent and the light entering into the fibre light-receiving waveguide layer is divided into a first light input with a signal wavelength for the small-area signal photodiode and a second light input with a supply wavelength for the plurality of supply photodiode(s).

14. The subassembly according to claim 11, wherein the waveguide-integrated small-area signal photodiode is configured as a transmitting diode which is connected to a planar antenna structure which is jointly integrated on the chip.

15. The subassembly according to claim 14, wherein the antenna structure is disposed on one or more dielectric layers.

16. The subassembly according to claim 14, wherein the antenna structure is configured as a logarithmically periodic, dipole or bowtie antenna.

17. The subassembly according to claim 14, wherein a monolithically jointly integrated electrical matching network between the small-area signal photodiode and the planar antenna is provided.

18. The subassembly according to claim 14, wherein the transmitting diode receives the high frequency signal and converts the high frequency signal into an electrical RF current which is radiated by the antenna forming a transmitting element.

* * * * *